UNITED STATES PATENT OFFICE.

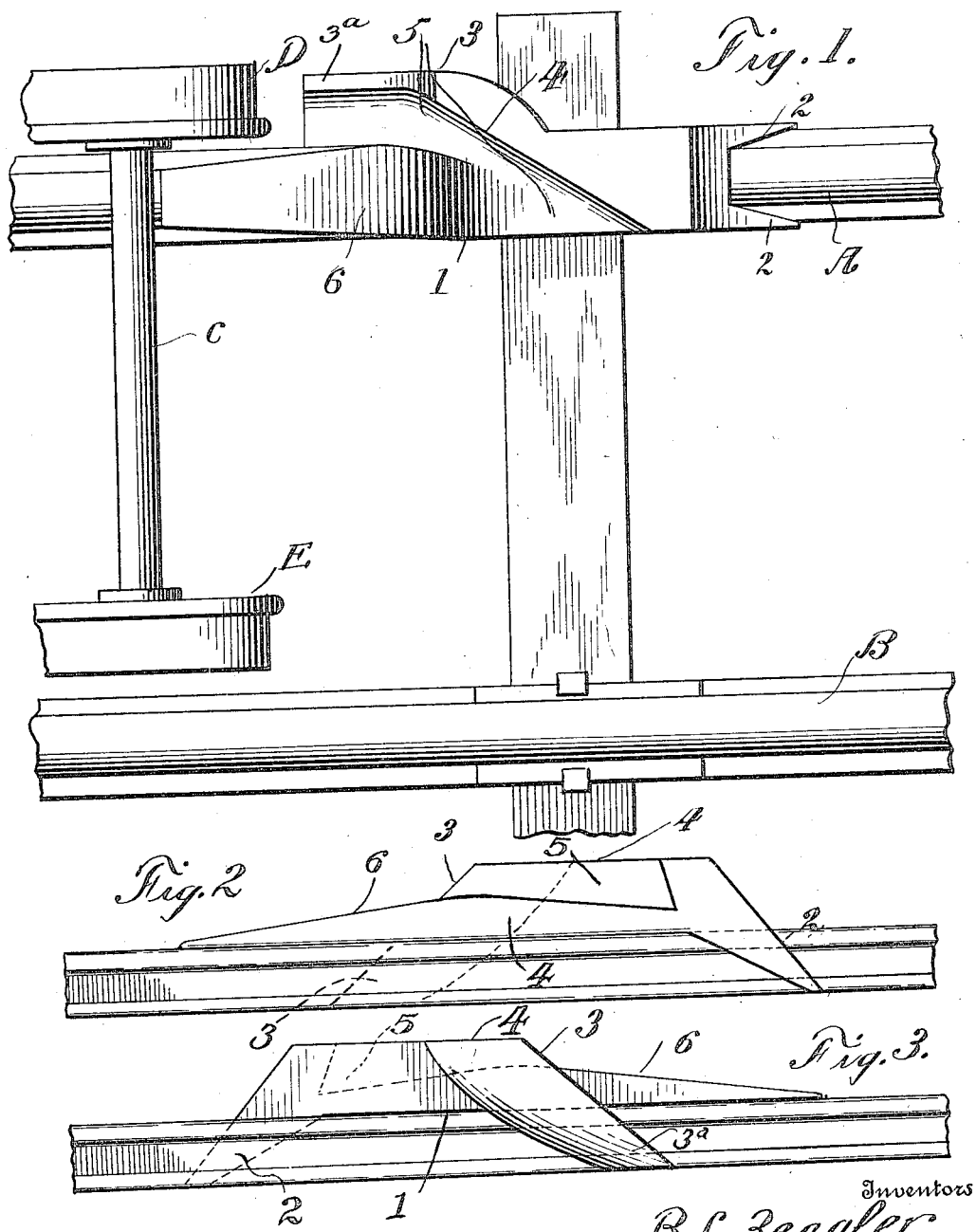

BENNIE L. ZEAGLER AND CHARLES L. STRYKER, OF LUFKIN, TEXAS.

CAR REPLACER AND DERAILER.

1,140,933.   Specification of Letters Patent.   Patented May 25, 1915.

Application filed May 20, 1912.   Serial No. 698,526.

*To all whom it may concern:*

Be it known that we, BENNIE L. ZEAGLER and CHARLES L. STRYKER, citizens of the United States, residing at Lufkin, in the county of Angelina and State of Texas, have invented certain new and useful Improvements in Car Replacers and Derailers, of which the following is a specification.

Our invention relates to devices for replacing the wheel trucks of cars on the track and also for derailing the trucks, and has for its object the provision of a device that is easily and quickly applied to the rails, dispensing with fastening means, and that is effective in operation.

Our invention will be described in detail hereinafter and illustrated in the accompanying drawings, in which, Figure 1 is a top plan view showing a fragment of a railroad track and a car truck in a derailed position with our improved device mounted on the track; Fig. 2 is a side view of the replacer and derailer showing the same applied to a rail and looking from the inner side of the rail. Fig. 3, a similar view looking from the opposite side of the device.

In the drawings similar reference characters will be used to designate corresponding parts throughout the several views.

In Fig. 1 is shown a fragment of a track having the rails A and B, and a truck C with its wheels D and E off of the rails A and B. Our improved replacer and derailer is adapted to be mounted on the rail A to replace the truck C with its wheels D and E on the rails A and B, and consists of a plate 1 adapted to seat upon the tread of the rail A and having at one end downwardly extending and forwardly inclined prongs 2 that engage the sides of the rail to hold the device in position thereon. 3 indicates an offset portion extending to the outside of the rail and having a downwardly extending projection 3ª that engages the outer side of the rail. The upper portion of the projection 3ª is formed with an inwardly inclined ridge 4 that is continued across the plate 1 and forms a track to engage the flange of the wheel D and carry it across and over the rail A to seat said flange on the inner side of the rail, while the other portion of said projection 3ª is formed with an upwardly inclined and laterally extending groove 5 to engage the flange and carry it with the tread of the wheel on to said laterally inclined ridge 4. The portion of the plate 1 at the end farthest removed from the prongs 2 is formed with an upwardly inclined surface 6 that is adapted to carry the wheels on trucks that they do not become derailed upward and over the ridge 4, heretofore described, after replacing the derailed truck on the track.

In use, it will be apparent that a displaced truck may be replaced upon the rail by placing my improved device on the rail in advance of said displaced truck so that the portion 3 will be in line with the wheel on the truck on the outside of the track, said wheel being indicated in Fig. 1 at D. Then by moving the car forwardly toward the replacer, the truck will be lifted by the wheel D engaging the inclined projection 3ª, the flange of said wheel riding in the groove 5 until the tread of the wheel engages the ridge 4, and the shoulder formed by said ridge by engaging the flange of the wheel, will force the wheel over and into alinement with the rail, the other wheel E in the meanwhile being forced on to the rail B. Should the trucks become derailed so that the wheels are in a reverse position from that shown in Fig. 1, that is if the wheel E should be outside of the track instead of the wheel D as shown, replacing may be accomplished by placing the replacer toward the rear of the train and backing the train to accomplish replacing of the wheels on the track. Should it be desired to derail the truck, the replacer is placed upon the track in advance of the truck to be derailed with the portion 3 extending inwardly of the track, so that the ridge 4 will engage the outside of the flange of the wheel, the tread riding on the upwardly inclined surface 6 and thus lifting the wheel from the track. In this manner, it will be apparent that the wheel will be forced to one side, drawing the wheel on the other track off from the rail and the truck will be derailed.

Having thus described our invention, what we claim is:—

A car replacer and derailer comprising an elongated plate having integral downwardly extending and forwardly inclined prongs formed upon opposite sides thereof adjacent one end adapted to engage the sides of a rail, said plate being adapted to lie upon the tread surface of a rail throughout its length, a lateral projection extending from one side of said plate at a point approximately centrally of the ends thereof, an upstanding ridge formed on said plate and outer edge of said lateral projection and extending angularly across said plate from edge to edge, said projection having a downwardly inclined portion and extending below said plate and the end of said plate farthest removed from said prongs being inclined upwardly to a point approximately centrally of the ends of said plate.

In testimony whereof we affix our signatures in presence of two witnesses.

BENNIE L. ZEAGLER.
CHARLES L. STRYKER.

Witnesses:
M. J. CARROLL,
J. T. GRIFFITH.

Copies of this patent may be obtained for five cents each, by addressing the "Commissioner of Patents, Washington, D. C."